US011709759B2

(12) United States Patent
Rodgers et al.

(10) Patent No.: US 11,709,759 B2
(45) Date of Patent: *Jul. 25, 2023

(54) CONTEXTUAL DRILL BACK TO SOURCE CODE AND OTHER RESOURCES FROM LOG DATA

(71) Applicant: Oracle International Corporation, Redwood Shores, CA (US)

(72) Inventors: Michael Patrick Rodgers, Lake Oswego, OR (US); Satish Chandra Oruganti, Bengaluru (IN); Shreyas Ravindranath, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,865

(22) Filed: Jun. 6, 2022

(65) Prior Publication Data

US 2022/0300395 A1     Sep. 22, 2022

Related U.S. Application Data

(63) Continuation of application No. 16/829,451, filed on Mar. 25, 2020, now Pat. No. 11,354,221.

(51) Int. Cl.
*G06F 11/36* (2006.01)
*G06F 16/955* (2019.01)
*G06F 11/30* (2006.01)

(52) U.S. Cl.
CPC ........ *G06F 11/364* (2013.01); *G06F 11/3065* (2013.01); *G06F 16/9558* (2019.01); *G06F 16/9566* (2019.01)

(58) Field of Classification Search
None
See application file for complete search history.

(56) References Cited

U.S. PATENT DOCUMENTS

| 6,539,501 | B1 | 3/2003 | Edwards |
| 6,802,059 | B1 | 10/2004 | Lyapustina et al. |
| 2002/0034719 | A1 | 3/2002 | Ikezawa et al. |
| 2002/0112096 | A1 | 8/2002 | Kaminsky et al. |
| 2002/0143750 | A1 | 10/2002 | Brunssen et al. |
| 2003/0037291 | A1 | 2/2003 | Goldsmith et al. |

(Continued)

OTHER PUBLICATIONS

U.S. Appl. No. 16/829,451, Non-Final Office Action, dated Aug. 20, 2021, 25 pages.

(Continued)

*Primary Examiner* — Qing Chen
(74) *Attorney, Agent, or Firm* — Kilpatrick Townsend & Stockton LLP

(57) ABSTRACT

A system receives real-time log messages from an executing process that experiences a runtime error. Information such as a filename and line number for the underlying source code may be embedded in the log messages using compiler macros. When the log messages are received, a developer URL may be generated that links a developer workstation directly to the underlying source code file and line number in a source code repository. A support URL may also be generated with a link to a support center and an embedded search string that retrieves resources that are known to address the process error.

20 Claims, 13 Drawing Sheets

(56) References Cited

U.S. PATENT DOCUMENTS

| | | |
|---|---|---|
| 2007/0260943 A1 | 11/2007 | Haskell |
| 2011/0131295 A1 | 6/2011 | Jolfaei |
| 2012/0110553 A1 | 5/2012 | Bates et al. |
| 2012/0324375 A1* | 12/2012 | Mathews ............... G06F 16/95 715/760 |
| 2013/0074038 A1 | 3/2013 | Fox et al. |
| 2014/0130016 A1 | 5/2014 | Menghrajani et al. |
| 2016/0224337 A1 | 8/2016 | Xia et al. |
| 2019/0324649 A1 | 10/2019 | Rodgers |

OTHER PUBLICATIONS

U.S. Appl. No. 16/829,451, Notice of Allowance, dated Feb. 7, 2022, 15 pages.

* cited by examiner

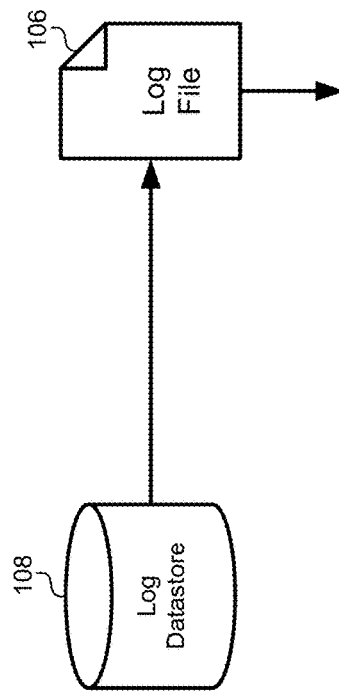

```
Nov 19 20:06:36.436006 – 4428/4844 WRK:Call Object    Entering AddObjectCache
Nov 19 20:06:36.436007 – 4428/4844 WRK:Call Object    Entering jdeTrackBusinessFunctionUsage
Nov 19 20:06:36.436008 – 4428/4844 WRK:Call Object    Exiting jdeTrackBusinessFunctionUsage
Nov 19 20:06:36.436009 – 4428/4844 WRK:Call Object    Entering JDB_ValidateActivateHUser (User 1084e198)
Nov 19 20:06:36.436010 – 4428/4844 WRK:Call Object    Exiting JDB_ValidateActivateHUser (User 1084e198)(numActive 0)
Nov 19 20:06:36.436011 – 4428/4844 WRK:Call Object    Entering JDB_ValidateActivateHUser (User 1084e198)
Nov 19 20:06:36.436012 – 4428/4844 WRK:Call Object    Exiting JDB_ValidateActivateHUser (User 1084e198)(numActive 1)
Nov 19 20:06:36.436013 – 4428/4844 WRK:Call Object    Entering JDB_ValidateActivateHUser (User 1084e198)
Nov 19 20:06:36.436014 – 4428/4844 WRK:Call Object    Exiting JDB_ValidateActivateHUser (User 1084e198)(numActive 0)

Nov 19 20:06:36.436015 – 4428/4844 WRK:Call Object    KNT0000068 – jdeCallObject Failed for ValidateAccountNumber
                                                     Support Documentation  Source Code Nov 19 20:06:36.436016 – 4428/4844 WRK:Call Object    no action properties to send, action property count = 0
Nov 19 20:06:36.436017 – 4428/4844 WRK:Call Object    no item properties to send, item property count = 0
Nov 19 20:06:36.437000 – 4428/4844 WRK:Call Object    Error count:Sent back – Server new #Error[1].#Warning:…
Nov 19 20:06:36.438000 – 4428/4844 WRK:Call Object    Entering JDB_ValidateHUser(User 1084e198)
Nov 19 20:06:36.438001 – 4428/4844 WRK:Call Object    Exiting JDB_ValidateHUser with Success (User 1084e198)
Nov 19 20:06:36.439000 – 4428/4844 WRK:Call Object    END BUSINESS FUNCTION type 901, 127.0.0.1_59474_m28
Nov 19 20:06:36.439001 – 4428/4844 WRK:Call Object    Checking Queue for transactions
Nov 19 20:06:36.445000 – 4428/11432 UNKNOWN           About to call dispatch function, flags=0x2, Type=950
```

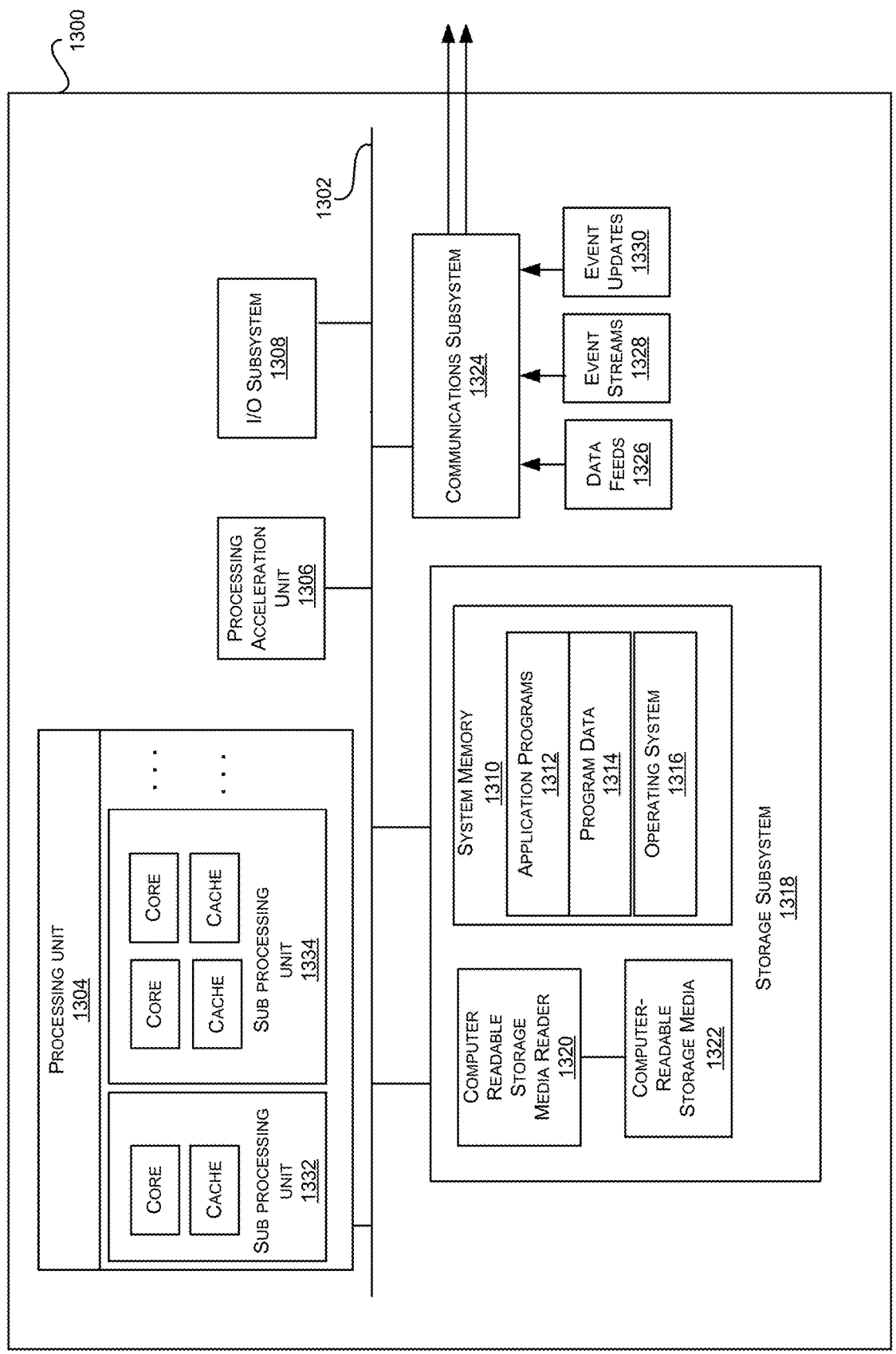

CONTEXTUAL DRILL BACK TO SOURCE CODE AND OTHER RESOURCES FROM LOG DATA

CROSS-REFERENCE TO RELATED APPLICATIONS

This application is a continuation of U.S. patent application Ser. No. 16/829,451 (now U.S. Pat. No. 11,354,221), filed Mar. 25, 2020, entitled "CONTEXTUAL DRILL BACK TO SOURCE CODE AND OTHER RESOURCES FROM LOG DATA," which is hereby incorporated by reference in its entirety.

BACKGROUND

In computing, a log file is a file that records events that occur as a software process executes. A log file may also collect messages between different processes in communication software. As events generate messages, these messages may be written to a log file to keep a record of transactions, events, or other items of interest as the process executes. Log files may be used for many purposes, including providing an audit trail to understand the activity of a process and to diagnose problems that occur at runtime. Log files may be particularly useful when errors occur during software execution. The log file may be examined to determine areas where the process executed correctly and areas where the process behaved unexpectedly. However, log files may be very large, with many hundreds of log messages written during a single session. Parsing log files to identify errors is very difficult, and using log files to generate solutions require many hours of investigation and expertise.

BRIEF SUMMARY

Log messages are automatically generated using message functions in program source code that are provided by most programming languages. As events or milestones are executed at runtime, these functions right log messages to a log file. Log messages may include error messages, trace messages, status messages, event messages, and/or any other type of message describing a state of an aspect of the program when the message is written. When an error occurs, the log is often the first place where developers and support personnel look in an attempt to diagnose a root cause of the error. However, these logs may include many hundreds or thousands of log messages, most of which do not include sufficient details for identifying the cause of the error. For example, typical messages may include a simple text string indicating that a function has been entered/exited, which may be repeated hundreds of times during a single process execution.

In the embodiments described herein, additional information may be added to the log messages to pinpoint specific locations in the underlying source code that may be responsible for the error. When log messages are received from a program, a diagnostic tool may process the log messages to generate URLs that link developers and support personnel directly to the resources needed to identify and solve the problem. Information related to the error may be extracted from the log messages and used to generate a developer URL. The developer URL may include an address and/or port for a source code repository. The information for the source code repository may be stored in a configuration file that is indexed by the particular program ID. The developer URL may also include a link to a specific source file and line number extracted from the log message. The developer URL may be embedded directly in the log as part of one of the log messages. When a developer clicks on the URL while examining the log messages, the link may take them directly to the location in the source code that caused the log message to be written. This allows a developer to immediately see code associated with each log message related to the error.

In addition to the developer URL, some embodiments may also generate a support URL. The support URL may include an address and/or port for a support center. This address and port may be stored in the same configuration file as the information for the developer URL. Additionally, the support URL may extract information related to the error from the log messages and generate a search string that may be automatically provided to a search interface at the support center. When a user at a support workstation clicks on the support URL, they may be routed directly to the support center, and the search string may automatically be used to generate a list of resources known to address the problem.

The combination of the support URL and the developer URL provides immediate solutions to provide support to a customer, as well as developer support to fix underlying bugs in the source code that generate the error. Both types of URL may be generated and embedded directly in the log file. Alternatively, each type of URL may be selectively generated and provided based on user credentials or a requesting system type. For example, a support workstation may generate and/or display only a support URL, while a developer workstation may generate and/or display both the support URL and the developer URL, as a developer will generally have permission to view both support material and source code. The filename and line number in the original log messages may be encrypted by the executed code and decrypted by the source code repository to protect the secrecy of the underlying source code.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5 illustrates an example of how the support URL and/or the developer URL can be embedded directly in the log file, according to some embodiments.

FIG. 13 illustrates an exemplary computer system, in which various embodiments may be implemented.

DETAILED DESCRIPTION

Figure 1:
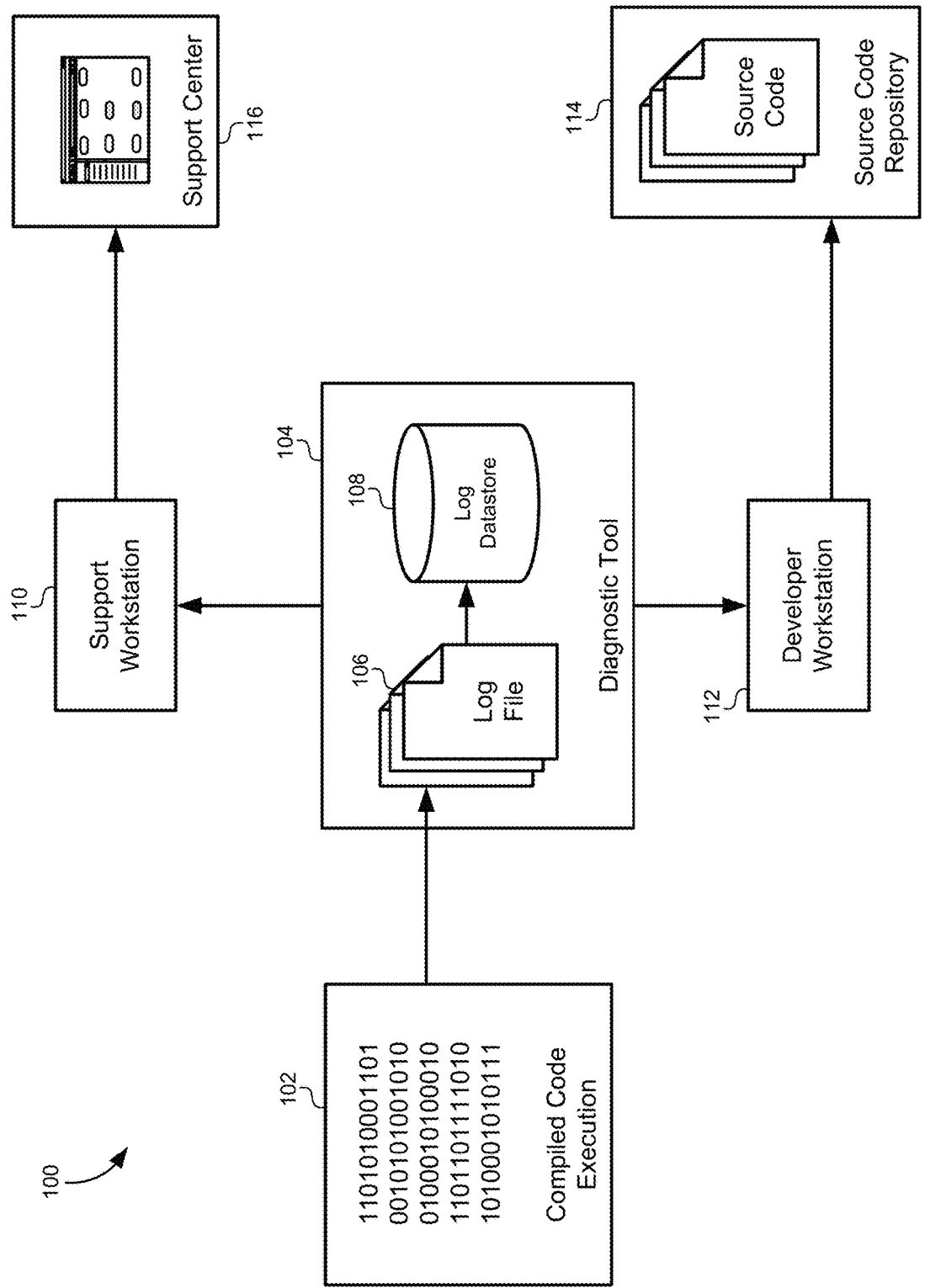
FIG. 1 illustrates a simplified block diagram of a system for analyzing log files to address real-time process execution errors, according to some embodiments.

Software executing on a client device may periodically write statements to a log during the course of execution. These statements may include progress statements or trace statements that indicate certain functions have been entered and/or exited. These statements may also include debug statements that include variable values and/or breakpoints. Additionally, many processes may write statements regarding the status of the program to an error log. For example, programming structures around code that may or may not succeed (e.g., try-catch or exception blocks) may be used to generate error messages when a process results in an error. These errors may include null value exceptions, invalid values, divide-by-zero errors, data formatting errors, and/or any other run-time error that may be generated. Each of these types of run-time messages that may be generated by an executable process may be written to a log file.

When an error occurs, the log file may be used to analyze the state of the process prior to encountering the error. The log file may include a path of functions or executed point of interest that are executed by the process, as well as error messages that may be generated by error-catching code. Some log files may include information similar to a call stack trace that indicates an executable path taken by the process. When an error occurs as the process executes during use by a customer, the customer execution may send the log file to a developer or support workstation. There, a support professional or code developer may examine the log file to determine the cause of the error in the executable process.

Troubleshooting an error using the log file may be routed to two different types of entities. First, the log file may be sent to a support workstation where a support professional can troubleshoot the log file to determine the cause of an error and provide real-time support to the customer. For example, users, admins, consultants, and/other support professionals may access the log file to help the customer solve the problem such that the process can return to operation as soon as possible. Support professionals may use a knowledge database or support center to access articles, troubleshooting guides, previously discovered solutions to similar problems, and/or other technical documentation that may be related to the error.

Second, the log file may be sent to a developer workstation where a code developer may also analyze the log file to determine a root cause of the error in the executable process. The developer may have access to a code repository that holds the original source code that was compiled for the executable process. By examining the log files, the code developer may attempt to identify a bug in the source files that caused the program to experience the error. Instead of troubleshooting the error in a real-time process like that of the support professionals, code developers generally work to fix bugs in the source code such that patches or new versions of the executable process can later be distributed to customers.

However, identifying root causes in the source code and identifying real-time solutions in a support database are both time-consuming and inexact processes that are done manually using lengthy log files. Using current technologies, log files may only provide clues as to what can be used to solve the immediate problem and to prevent the problem from occurring in the future. For example, mapping a diagnostic statement to an actual location in the source code requires extensive knowledge of the source code, and precise locations in the source code may not always be evident from the log statements alone. Additionally, identifying search topics or existing solutions in a support database to arrive at a correct solution using only the information in the log also requires extensive knowledge of the code and any existing solutions. In both of these examples, the effectiveness and speed with which an error can be addressed relies primarily on the expertise of a human user.

The embodiments described herein alter the existing functionality of diagnostic tools that may be used to store, process, and/or analyze log files as they are generated by executable processes. These embodiments streamline the debugging process for run-time issues from both a developer standpoint as well as a support standpoint. These embodiments provide not only significant time savings as source code and support solutions are immediately and automatically identified, but they also provide more reliable solutions because human error is virtually eliminated from the process. As described in detail below, URLs may be generated from the log file received from an executable process, and the URLs may be used to immediately access specific locations in the source code and to access relevant support resources in a support center.

FIG. 1 illustrates a simplified block diagram of a system 100 for analyzing log files to address real-time process execution errors, according to some embodiments. Compiled code may be executed as an executable process 102. The process may be executed by a customer, and thus may be executed at a client device and/or through a cloud-based platform provided to the customer. The executable process may be generated by compiling source code and deploying the compiled process to the client device and/or cloud platform. The source code may include a number of different log commands (e.g., writeLogMessage( ), errorMessage( ), etc.) that can be used to write messages to a log file at runtime as the process is executed. For example, when a function is called, the source code may include a command to write a log message indicating the name of the function and any parameters passed to the function. In another example, when a try-catch block generates an exception, an error message may be written to the log that includes an error code and/or textual description of the error (e.g., "null value exception"). Error messages may be written to memory and then stored in a text file when the process stops executing. Other embodiments may write log messages to a text file during execution. Some embodiments may also write error messages to a database or to other types of document formats, such as XML, JSON, and any other structured format.

When the error occurs and/or when the process stops executing, the log file 106 that includes the messages written to the log during program execution may be stored in a log data store 108. This may include log files from a current execution, as well as log files from previous executions of this and other processes. In some embodiments, the log data store 108 may record logs from each process that encounters an error during execution. The log data store 108 may also record logs from each process execution regardless of whether there was an error during execution. The log data store 108 may be part of a diagnostic tool 104 that may be accessed by support and/or developer personnel.

Typically, when an error occurs in the executable process 102, the customer executing the process 102 may call or otherwise alert the support personnel to the error. For example, the customer may open a support ticket or incident report that is transmitted the support personnel. The system 100 may include a support workstation 110. The support workstation 110 may be broadly construed as any computing system that receives reports of run-time errors in the executable process 102. The support workstation 110 may include multiple processors, memory devices, servers, and/or other computing systems. The support workstation 110 may also provide various diagnostic tools to support personnel when examining log files, such as text editors and/or other applications designed to display and navigate log files. The support workstation 110 may also include a browser or other interface that may be used to access a support database, a knowledge database, and/or other support resources that may be provided by a software provider. For example, the support workstation 110 may include a browser that connects to a support center 116 and acts as a front-end to a knowledge database and/or other resources that may be used to troubleshoot a software error. When an error occurs in the executable process 102, the support workstation 110 may receive a notification and retrieve the corresponding log file 106 related to the specific process execution. The support workstation 110 may then allow support personnel to browse the log file 106 and manually find support information through the support center 116.

Similarly, when the error occurs in the executable process 102, a developer workstation 112 may be alerted to the error. The developer workstation 112 may include similar applications to those operating on the support workstation 110 that allow developer personnel to access, browse, and navigate the log file 106. The developer workstation 112 may also include development tools, such as development toolkits, integrated development environments (IDEs), compilers, and/or other code development tools. The developer workstation 112 may also include an interface or portal that allows access to a source code repository 114. The source code repository 114 may include the source code that was compiled to generate the executable process 102. Therefore, the developer workstation 112 may provide access to a log file and allow the developer personnel to manually examine the source code in the source code repository 114 to identify any errors in the original source code that may have caused the error in the executable process 102.

Figure 2:
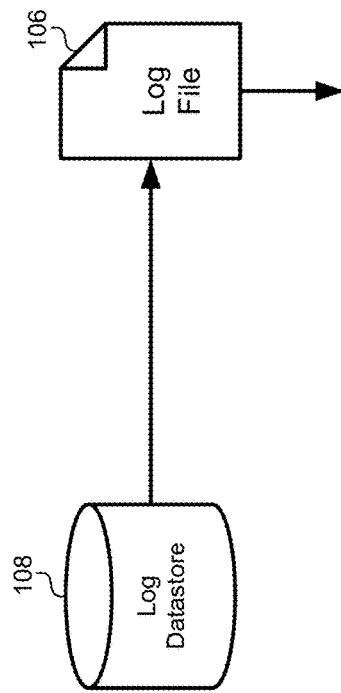
FIG. 2 illustrates an example of an existing log file, according to some embodiments.

FIG. 2 illustrates an example of an existing log file 106, according to some embodiments. As described above, the log file 106 may be generated during and/or after the execution of a process. The log file 106 may be stored between process executions in a log data store 108. The log file may include a plurality of messages or log statements that are written to the log file 106 as the process is executed. As illustrated in FIG. 2, the log file 106 may include "Entering" statements and "Exiting" statements that are written to the log as the process execution enters and/or exits various functions in the executable code. In this example, the log file 106 also includes an error message 202 that was written to the log file 106 as a result of a run-time error. This error message 202 may be generated in response to an exception being generated within a try-catch block. In some embodiments, the try-catch block may include an error message that describes the type of error that occurred and any parameters that may be available to the message function. In this example, a message within the error message 202 includes an error code (e.g., "KNT0000068") that represents a numerical indicator for a specific error condition. The message may also include a textual description of the error (e.g., "jdeCallObject Failed for ValidateAccountNumber") that textually describes the type of error that occurred and includes parameter types and/or values that may be involved in the error.

Prior to this disclosure, support and/or developer personnel would only have the raw log file 106 to work with in diagnosing and solving a run-time error in an executable process. For example, they would need to retrieve the log file 106 and parse the many different log messages that were written to the log file 106 as the process executed. For large software applications, the number of messages written to the log file 106 may include many hundreds or thousands of log messages. The support and/or developer personnel would then be required to manually parse the log file 106 and locate any log messages that (in their opinion) were related to the error message. Support personnel would then need to consult different support resources (e.g., white papers, forums, threads, articles, user manuals, and/or other support resources) to try and find a solution to one of the many different errors that may be identified in the log file. Developer personnel would examine the log file 106 and then try to identify locations in the original source code where the error may have been generated. This would involve tracing through the execution path of the log file and manually parsing different source code files to identify the right error message. Note that simply executing a "search" command on the source code generally was not helpful since the same error messages may be used hundreds of times throughout each file.

Figure 3:
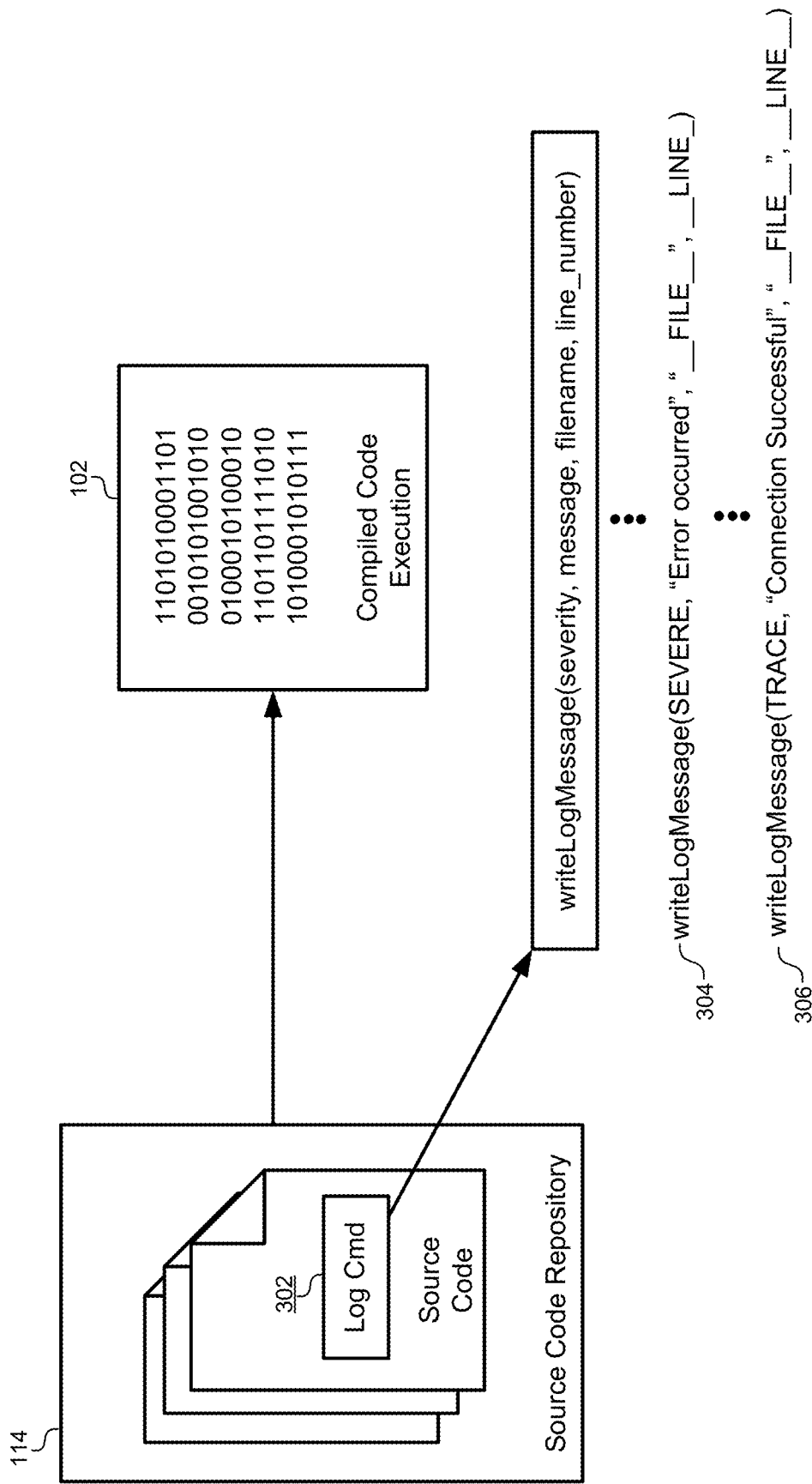
FIG. 3 illustrates a simplified block diagram of changes that may be made to the source code to more precisely identify related locations in the source code during a run-time error, according to some embodiments.

FIG. 3 illustrates a simplified block diagram of changes that may be made to the source code to more precisely identify related locations in the source code during a run-time error, according to some embodiments. In addition to providing a message that describes the type of error, along with an error code and/or severity of the error, some embodiments may also provide parameters to a log command 302 that precisely describes a source code location. For example, a log command 302 may be inserted into the source code before it is compiled. The log command 302 may include parameters for a filename and a line number. In some embodiments, the file name and/or line number may be inserted statically into the code by the software developer. In other embodiments, software utilities may be used to dynamically insert the line number and/or filename into the source code at compile time. For example, C/C++ may include preprocessor macros such as "_FILE_" and "_LINE_" that instruct the compiler to replace these macros with the line number and filename when the program is compiled. In another example, the Java programming language may include access to the call stack to provide information that may be used to identify the location of the log message in the source code.

This information providing a location in the source code for the error message may be passed as parameters to the log command 302. The log command may then write the information to the log file as part of the log message. For example, log command 304 illustrated in FIG. 3 may write a log entry indicating that a severe error occurred at a particular line number in a particular file. Log command 306 illustrated in FIG. 3 may write a log entry indicating that a connection was successfully created at a particular line number in a particular file. Some embodiments may write the location information directly to the log file. However, some embodiments may write a traditional log message to the log file, with a severity, error code, and/or message while storing the line number/filename separately as metadata. This allows the log file generated by these embodiments to be compatible with traditional log files, while still providing more information for each log message in the log file.

Figure 4:
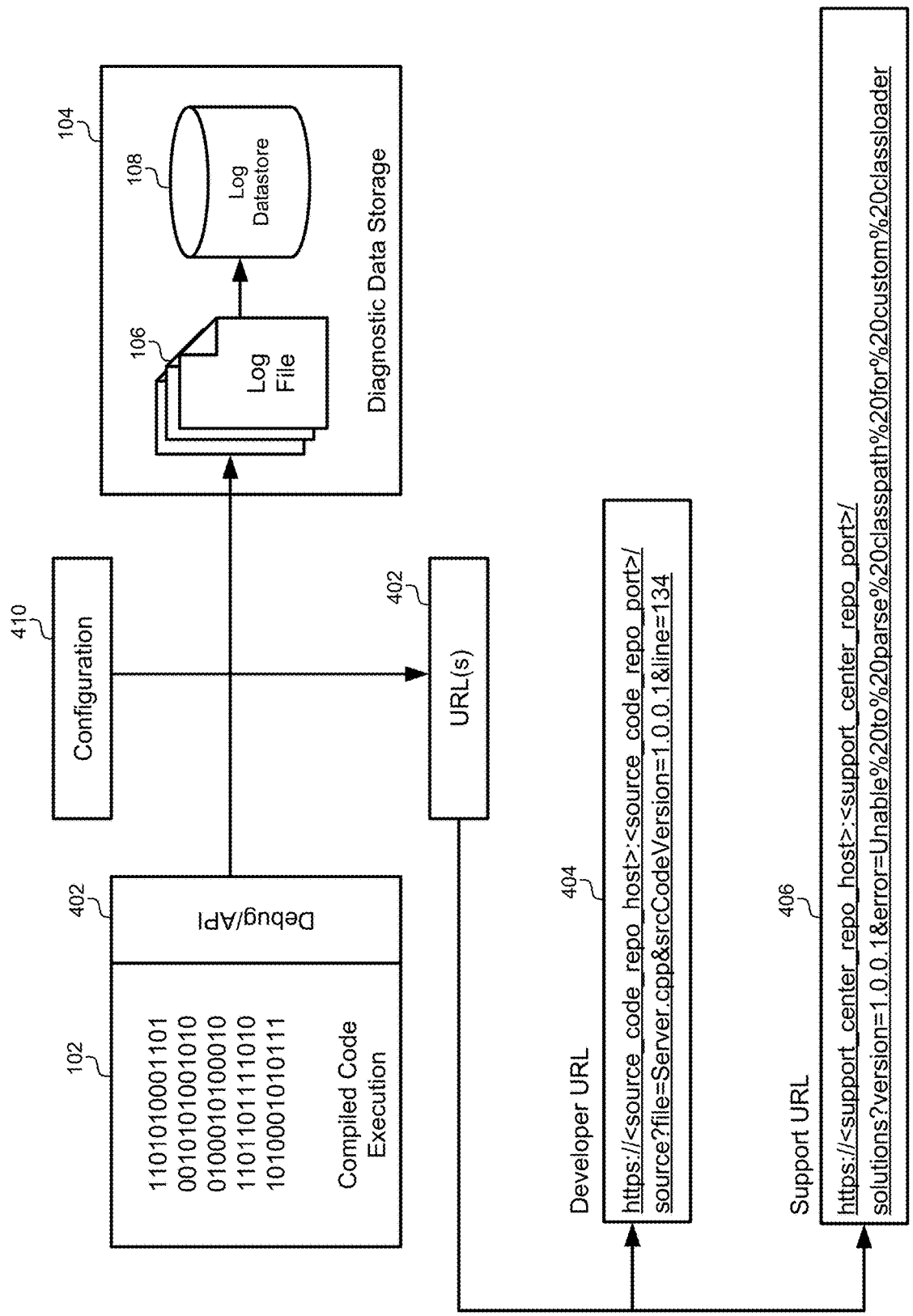
FIG. 4 illustrates how a run-time error may write information to a log file with additional information associated with an error, according to some embodiments.

FIG. 4 illustrates how a run-time error may write information to a log file with additional information associated with an error, according to some embodiments. When the executable process 102 executes on the client device, cloud platform, and/or other computing device, a debug utility 402 or API may receive log messages as they are output from the executable program 102. These log messages may be processed, stored, and used to generate URLs in a number of different ways. FIG. 4 illustrates one method by which log messages in a log file may be handled, but this is provided only by way of example and is not meant to be limiting. Other variations are described below.

When an error occurs in the executable process 102, the log file may be provided to the diagnostic tool 104. As described above, the log file may include line numbers, filenames, and/or other metadata written directly to the log messages or stored separately. The diagnostic tool 104 may receive the log messages and generate one or more URLs 402 that may be used by a developer workstation and/or a support workstation. The URLs may include information extracted from the log messages themselves, as well as additional information that may be extracted from a configuration 410 and/or from other sources.

In some embodiments, two different URLs may be generated. A first URL may be referred to herein as a developer URL 404. The developer URL 404 may be provided to a developer workstation for the benefit of developer personnel, and may provide a link directly to a location in a source code file in a source code repository. A second URL may be referred to herein as a support URL 406. The support URL 406 may be provided to a support workstation for the benefit of support personnel, and may provide a link directly to one or more support resources to provide real-time support for the executable process 102.

The developer URL 404 may include various types of information associated with the error embedded in the URL itself. The purpose of the developer URL 404 may be to provide a link directly to a location in a source code file that generated the error message. When the developer workstation accesses the log file 106, the developer may simply click on the URL 404 to be automatically taken to the location in the source code file. For example, the developer workstation may access a source code repository and automatically open the corresponding source code file and move the cursor to the specified line number. This provides a simple method of looking at each source code location that may be specified in a log file. Instead of examining an error message and trying to identify the proper source code file and/or line number, this URL provides a direct link to the originating location in the source code.

For example, the developer URL may include a source code filename and/or a source code line number. The filename and/or line number may be provided directly from the log message resulting from the macros in the log command of the source code. Additionally, the developer URL 404 may include a source code version, a source code repository host, and/or a source code repository port. The code version, repository host, and repository port may be specified in the configuration 410. For example, the configuration 410 may include a configuration file that is loaded by the diagnostic tool 104. The configuration 410 may include a lookup table that specifies the version/host/port for each of the executable processes that may provide log files to the diagnostic tool 104. When the particular executable process 102 generates an error and provides the log file 106, the diagnostic tool 104 may access the configuration 410 and look up the version/host/port for that particular executable process 102. This information may then be used to construct the developer URL 404. An example of the developer URL 404 is illustrated in FIG. 4. This developer URL 404 includes an HTTP path that is built using the host and port for the source code repository. Additional parameters in the path can store the filename, code version, and/or line number in the URL. Note that this example of a developer URL 404 is provided only by way of example and is not meant to be limiting. Many other techniques for constructing a URL may be used to include the diagnostic information for accessing a specific source code file.

In contrast, the support URL 406 may include specific information that may be used by support personnel to provide real-time support for a customer executing the process 102. The purpose of the support URL 406 may be to provide a link to any support resources that are directly related to this type of error. Instead of manually analyzing an error message and examining tens or hundreds of manuals, articles, and other support resources, the support personnel can simply click on the support URL 406 to be taken directly to support resources that are known to address the error.

The support URL 406 may include a number of different types of information. For example, in addition to the information used in the developer URL 404 described above, the support URL 406 may include a contextual error message, a product version, and information that references specific support resources. In some embodiments, this information may reference specific support resources by providing a support center search string. Prior to this disclosure, a user would need to analyze an error message and search for various topics that may be related to the error in a support center search interface. These embodiments allow support personnel to instead simply click on the support URL 406 to automatically populate a search interface with a predefined string to retrieve support resources that are known to be relevant to the particular error. FIG. 4 illustrates an example of a support URL 406 that includes an HTTP address for the support center and port along with a search string that may be provided to the search interface.

The search string may be provided by the configuration 410. For example, a lookup table in the configuration 410 may include various error codes that may be part of the log message written to the log file 106. Each error code may be associated with a particular search that may be relevant to that type of error. When the developer defines various error messages or other indicators that may be part of the log file, the developer may populate a table in the configuration 410 with search strings that are related to the particular errors.

The diagnostic tool 104 may then access the configuration 410 and construct the support URL 406 using one or more search strings retrieved from the configuration 410. Note that this example of a support URL 406 is provided only by way of example and is not meant to be limiting. Many other techniques for constructing a support URL 406 may be used to include information for linking directly to support resources.

FIG. 5 illustrates an example of how the support URL and/or the developer URL can be embedded directly in the log file, according to some embodiments. As described above, the log messages from the executable process 102 may provide information such as a filename and/or a file number. However, the log message may be written as a traditional log message such that this information need not be included explicitly in the stored version of the log message. Instead, some embodiments may generate the support URL and/or the developer URL and embed these URLs directly in the log file 106. These URLs may be stored as hyperlinks in the log file 106. In the example of FIG. 5, the log file 106 includes a log message 502 indicating a possible error in the executable process. The log message 502 includes a hyperlink for the support URL and a hyperlink for the developer URL embedded directly in the log message 502. These URLs may correspond to the support URL and/or developer URL described above in relation to FIG. 4.

When the developer workstation loads the log file 106, the "Source Code" hyperlink may be displayed as part of the log message 502. Note that multiple entries in the log file 106 may include developer URLs and/or support URLs, even though FIG. 5 only illustrates a single log message 502 that includes such URLs. To debug the error, the developer may click on each of the "Source Code" hyperlinks in the log file 160 be taken directly to the corresponding source code file and/or line number in the source code repository. This eliminates the manual process of trying to identify the correct file/line related to each error message. Instead, error messages may be quickly evaluated in light of the associated source code to identify causes of the error.

Similarly, when a support workstation loads the log file 106, the "Support Documentation" hyperlink may be displayed as part of the log message 502. To provide support for the error, the support personnel may click on the "Support Documentation" hyperlink in the log message 502 to be taken directly to a support center where support resources may be accessed. Clicking the hyperlink may also populate a search interface in the support center to automatically retrieve one or more support resources that may be used to provide real-time support to a customer experiencing the error.

Figure 6:
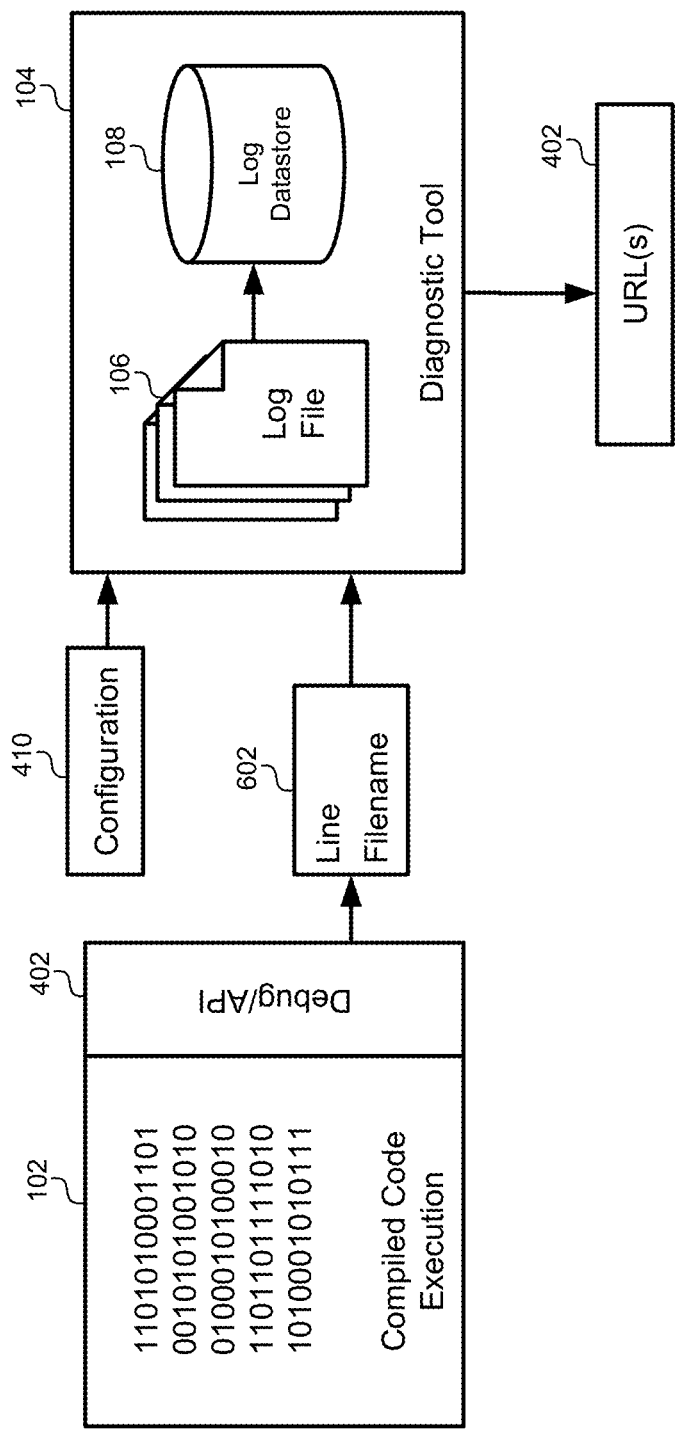
FIG. 6 illustrates an example of how the diagnostic tool can generate URLs as they are accessed, according to some embodiments.

FIG. 6 illustrates an example of how the diagnostic tool can generate URLs as they are accessed, according to some embodiments. The support URL and/or developer URL may be generated when the log file 106 is stored in the log data store 108. In the example of FIG. 5, the URLs may be generated and stored in the log file 106 when they are received from the debug utility 402 and stored in the log data store 108. However, in some embodiments, the support URL and/or developer URL may be generated when the log file 106 is accessed. Generating the support URL and/or developer URL "on-the-fly" as they are accessed may prevent the log data store 108 from redundantly storing information in the same log file 106 and across all log files. For example, the HTTP address of the support center and port may be the same in each of the URLs. By generating these URLs when they are accessed, the log data store 108 need not store this information for each URL generated in each log file. This may significantly reduce the size of the log data store 108. The URLs may be generated and sent with or within the log file 106 to the developer workstation and/or support workstation.

As illustrated in FIG. 6, the diagnostic tool 104 may receive a request from the support workstation and/or the developer workstation for the log file 106. The diagnostic tool 104 can retrieve the corresponding log file 106 and generate one or more URLs 402 when the log file 106 is sent to the corresponding workstation. The diagnostic tool 104 may access the configuration 410 and the filename/line number 602 to generate the URLs 402. The URLs 402 may be embedded in the log file 106 when it is sent to the workstations as described above. Alternatively, the URLs 402 may be provided separately and inserted or otherwise displayed by software on the workstation that is configured to display, edit, and navigate the log file 106.

Figure 7:
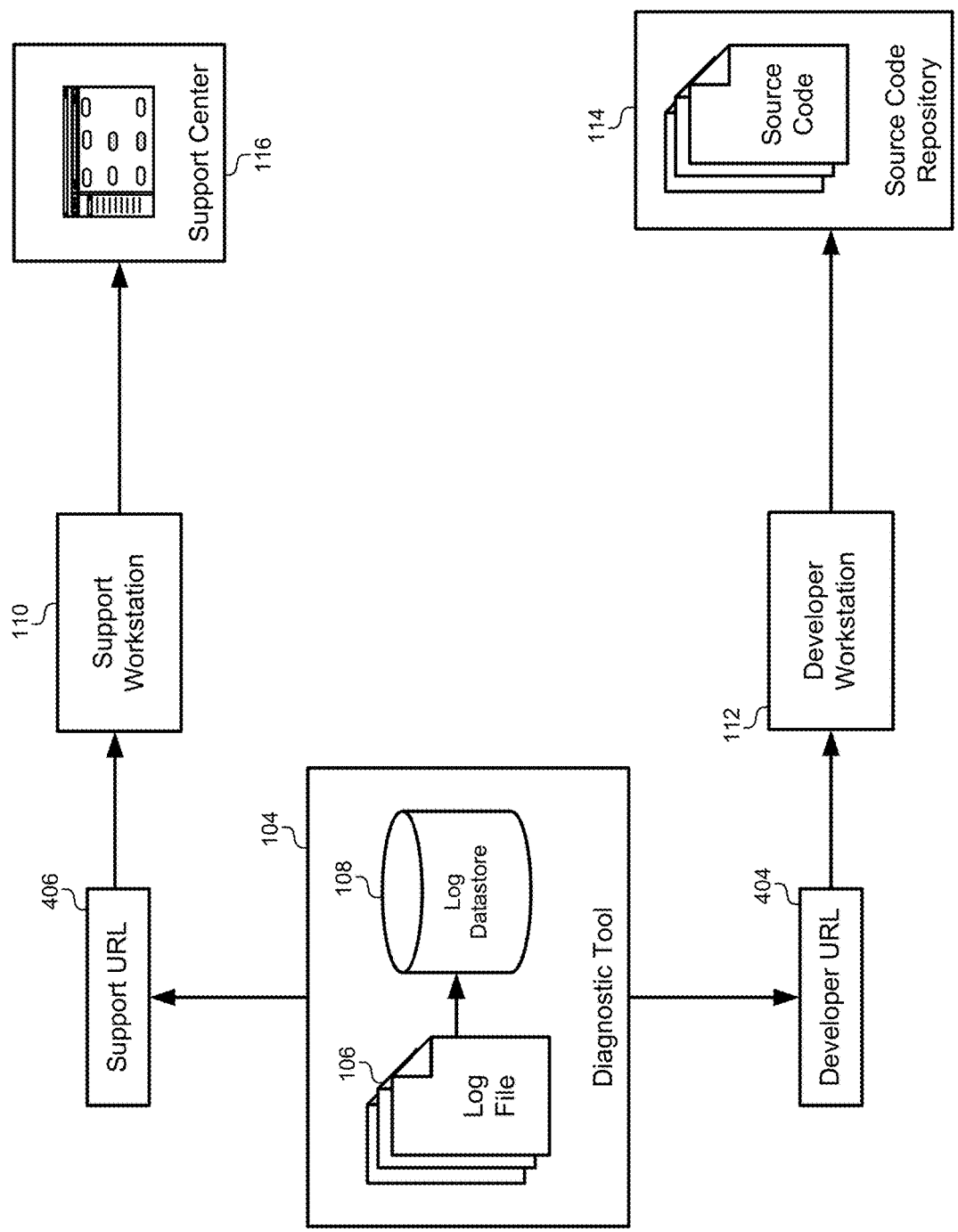
FIG. 7 illustrates an example of how each workstation can use the URLs to access solutions or source code for the error, according to some embodiments.

FIG. 7 illustrates an example of how each workstation can use the URLs to access solutions or source code for the error, according to some embodiments. The type of URL displayed may depend on the type of workstation and/or personnel accessing the log file 106. For example, when the support workstation accesses the log file 106, the diagnostic tool 104 may generate the support URL without generating the developer URL and send the support URL to the support workstation. Similarly, when the developer workstation accesses the log file 106, the diagnostic tool 104 may generate the developer URL without generating the support URL and send the developer URL to the developer workstation. This may prevent the system from providing unneeded information to each type of workstation. For example, the support workstation may not have access to the source code repository in some embodiments. By only generating the support URL, the system can prevent the support workstation from displaying a URL that could not be accessed without developer permissions.

Some embodiments may take additional measures to protect the source code in the source code repository. For example, some embodiments may encrypt the line number and/or filenames as they are provided to the log data store 108. These fields may also be encrypted when they are used to generate the developer URL. In this case, the source code repository may receive the URL with the encrypted file name and/or line numbers, then decrypt the file name and/or line numbers. Once decrypted, these fields can be used to access the specific location in a specific source code file when it is retrieved.

In some embodiments, both the developer URL 404 and the support URL 404 may be generated and sent to each of the workstations. The type of workstation may then determine which URL type to display. For example, an application for viewing, editing, and navigating log files on the support workstation 110 may be configured to display the support URL 406 while deactivating or removing the developer URL 404. The application on the developer workstation 112 may similarly make the developer URL 404 active and visible while deactivating or removing the support URL 406 from the log file. Some embodiments may make both the support URL 406 and the developer URL 404 visible and active at the developer workstation 112, as the developer personnel will generally have permission to access both the source code repository 114 and the support center 116.

In some embodiments, the support URL 406 may be generated at the support workstation 110. Instead of generating the support URL 406 at the diagnostic tool 104, the diagnostic tool 104 can send the log file 106, along with any metadata (e.g., filename, line number) to the support workstation 110. The support workstation 110 may then access the configuration described above to extract the additional information needed to generate the support URL 406. Similarly, the developer workstation 112 may generate the developer URL 404 after the log file 106 is sent from the diagnostic tool 104.

Figure 8:
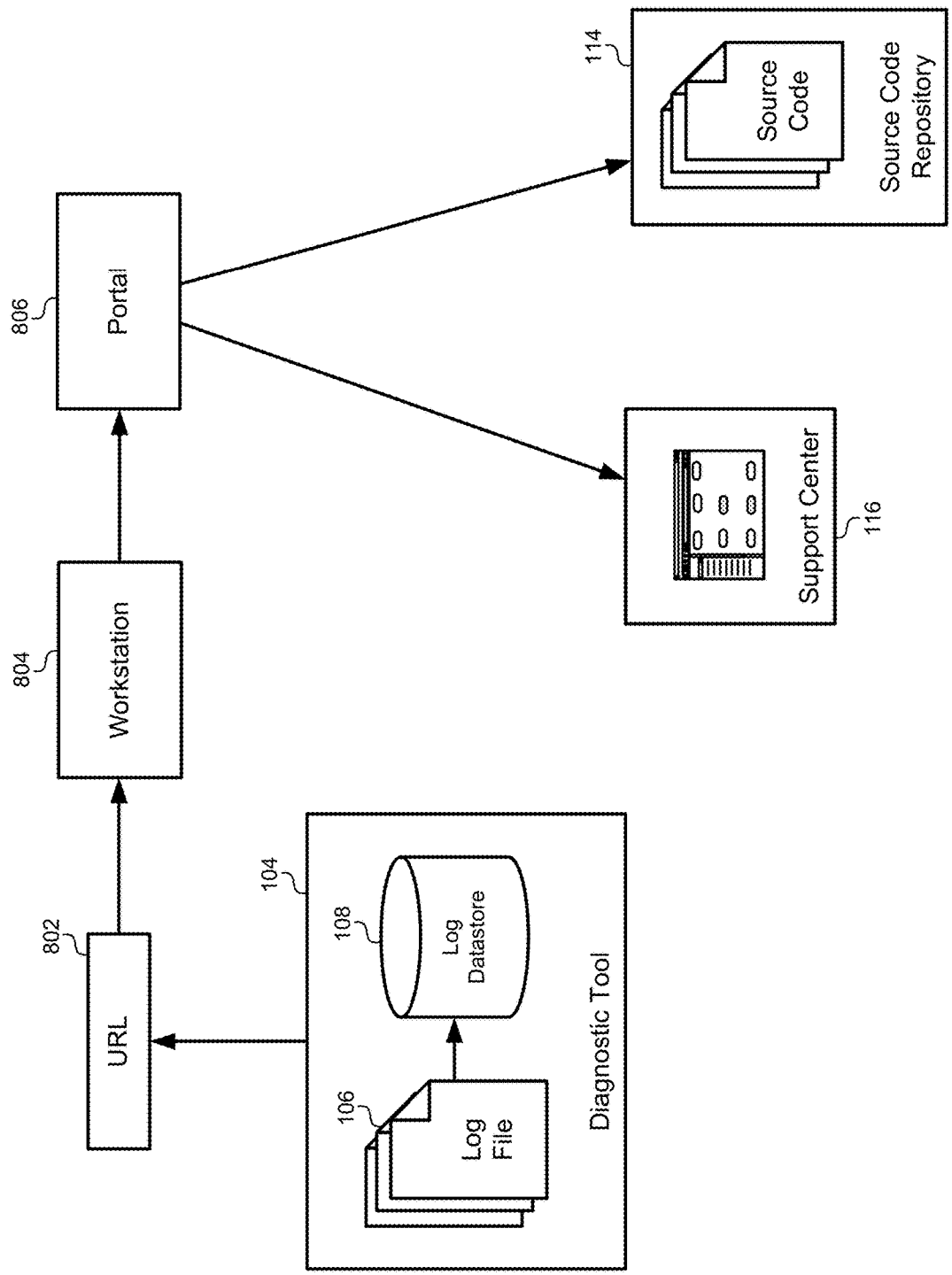
FIG. 8 illustrates how a portal may be used to route requests through a single URL, according to some embodiments.

FIG. 8 illustrates how a portal may be used to route requests through a single URL, according to some embodiments. Instead of generating separate URLs for the support workstation and the developer workstation, some embodiments may generate a single URL 802 that includes the information that may be common to both URL types. Instead of being routed directly to the support center 116 and/or the source code repository 114, the URL 802 may send a request from the workstation 804 to a portal interface 806.

The portal interface may require a login or other form of authentication after receiving the URL 802. For example, a session token or username/password may be received by the portal interface 806 to identify and authenticate the personnel operating the workstation 804. If a developer is using the workstation 804, then the credentials may identify the developer, and the permissions associated with the developer's credentials may allow the portal 860 to grant access to the source code repository 114. The portal 806 may then route the request to the source code repository 114. This may include generating the developer URL as described above such that the source code repository 114 receives a request for a specific filename and/or specific line number to be retrieved to the workstation 804.

Alternatively, if support personnel are using the workstation 804, the portal 806 may automatically recognize the permissions associated with the support personnel's credentials and generate a URL that routes the request to the support center 116. This URL may be similar to the support URL described above. For example, the URL may include a host/port for the support center 116, along with a search string that may be provided to a search interface to automatically load predetermined support resources that address the error.

In some embodiments, the error may be a new error that has not yet been encountered in the system. In this case, the support URL may address a discussion forum or social media interface where a discussion of the error can take place. The support URL may generate a stub or new thread in the forum and post the contents of the error message and/or any other details related to the log file 106. The support URL may also generate a message that solicits feedback from other users (e.g., "has anyone experienced this error before?"). Thus, the support resource to address the error may include beginning a new discussion using information from the log file.

Some embodiments may monitor the new discussion thread for any resources provided by other users and automatically provide those resources to the workstation 804. For example, if another user posts a white paper, user manual, instructional video, webpage, and/or any other resource addressing the problem, the portal 806 may retrieve these resources and provide them to the workstation 804. Furthermore, the configuration described above may be updated such that a search may be added for this type of error. The new search string may be configured to retrieve the resources provided in the new forum/thread. This allows the configuration to be dynamically updated with new search strings to address new error types as they occur.

Figure 9:
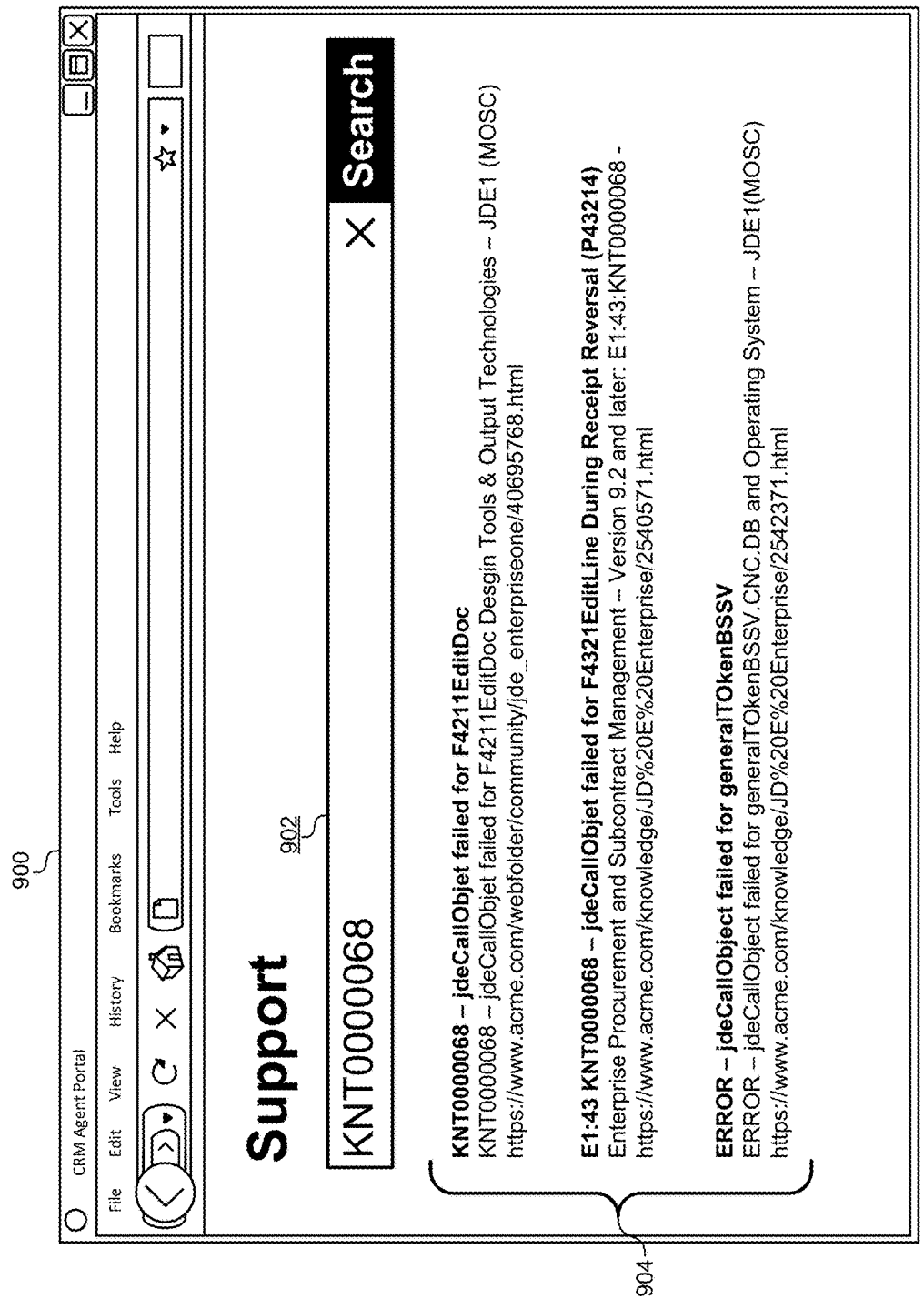
FIG. 9 illustrates a user interface with results of a support URL as it is provided to a support center, according to some embodiments.

FIG. 9 illustrates a user interface 900 with results of a support URL as it is provided to a support center, according to some embodiments. The user interface 900 may be displayed on a support workstation in response to the user clicking on the support URL. For example, the user may click on the "Support Documentation" hyperlink in the log message 502 of FIG. 5. Clicking the URL may automatically direct the browser to the support center. In this example, the search string (e.g., "KNT0000068") representing an error code may be used to automatically populate a search interface 902 of the user interface 900. The search interface 902 may be executed to retrieve one or more support resources 904 from the support center. Links to the support resources 904 may be displayed in the user interface such that they are readily available to the support personnel. Clicking the support URL may generate the contents displayed in FIG. 9 such that the user does not need to determine a search string, enter the search string, execute the search, and so forth. Instead, the user only needs to evaluate the support resources 904 that are configured to be responsive to the error.

A similar user interface may be generated for the developer URL. Instead of displaying a search interface and/or support resources, the developer URL may open a particular source code file in a text/code editor. The cursor may also be placed at a particular line number within the source code file, indicating the location of the log command that caused the developer URL to be generated from the log file.

Figure 10:
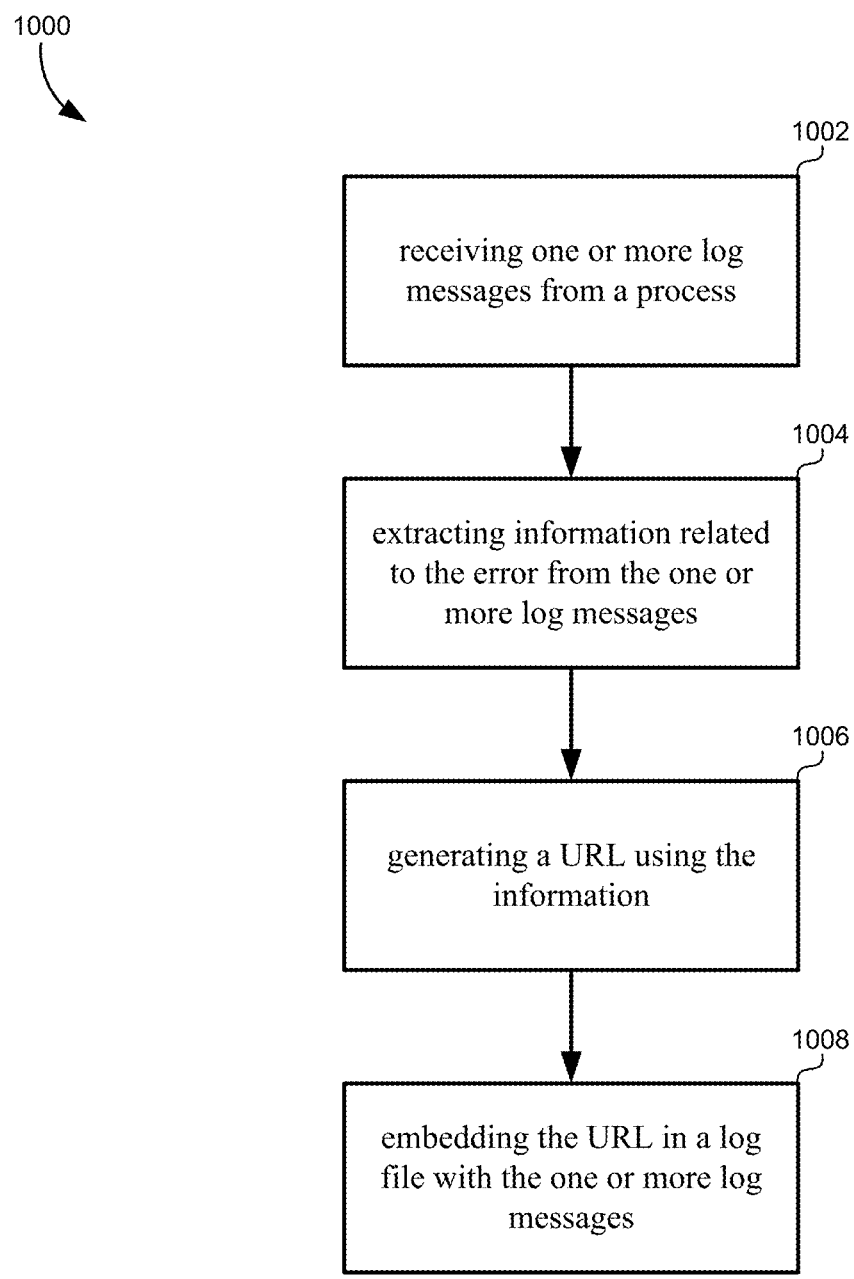
FIG. 10 illustrates a flowchart of a method for generating URLs in log files for source code repositories and support centers, according to some embodiments.

FIG. 10 illustrates a flowchart of a method for generating URLs in log files for source code repositories and support centers, according to some embodiments. The method may include receiving one or more log messages from a process (1002). The one or more log messages may be generated while the process executes, and the one or more log messages may be stored in a log file. The log messages may be generated through an API or debug interface, and they may result from log commands that are inserted in the source code of the process before it is compiled. The log commands may include macros or other language-specific utilities to identify a location (e.g., filename, line number) of the log command. The process may experience an error during execution, and the log file may be provided to a log data store or other utility that stores log files. Examples of this process are described throughout this disclosure, including FIGS. 3-4.

The method may also include extracting information related to the error for the one or more log messages (1004). The extracted information may include information that relates to a location of the error message in source code, such as a filename and/or line number. The information may also be extracted from a configuration file that includes host/port addresses for a support center and/or a source code repository. The information may also include a search string that may be used at the support center. Examples of this process are described throughout this disclosure, including FIG. 4.

The method may additionally include generating a URL using the extracted information (1006). In some embodiments, multiple URLs may be generated, such as a developer URL and/or a support URL as described above in relation to FIGS. 4-8. The URL may also be embedded in a log file with the one or more log messages (1008).

It should be appreciated that the specific steps illustrated in FIG. 10 provide particular methods of generating URLs according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
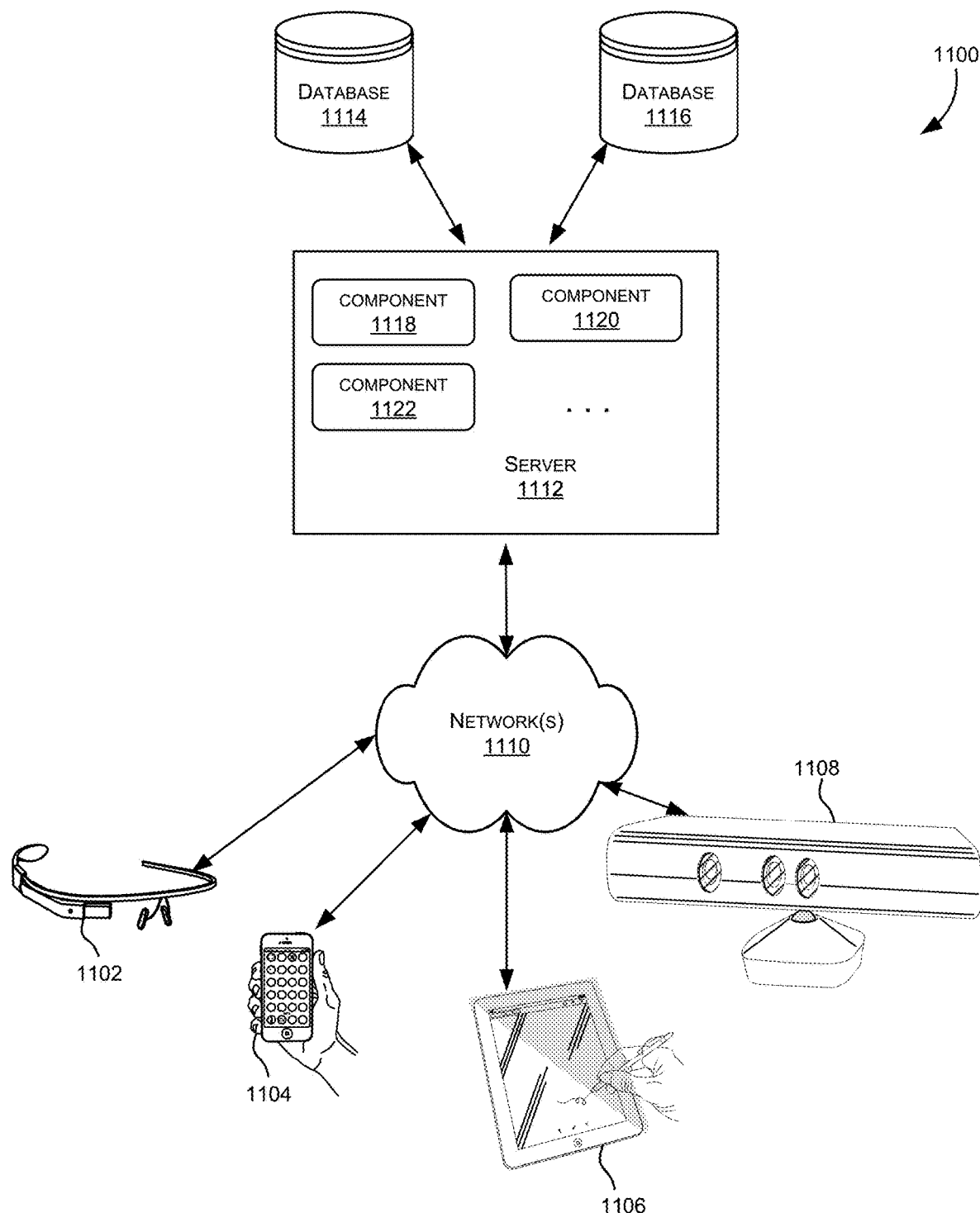
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
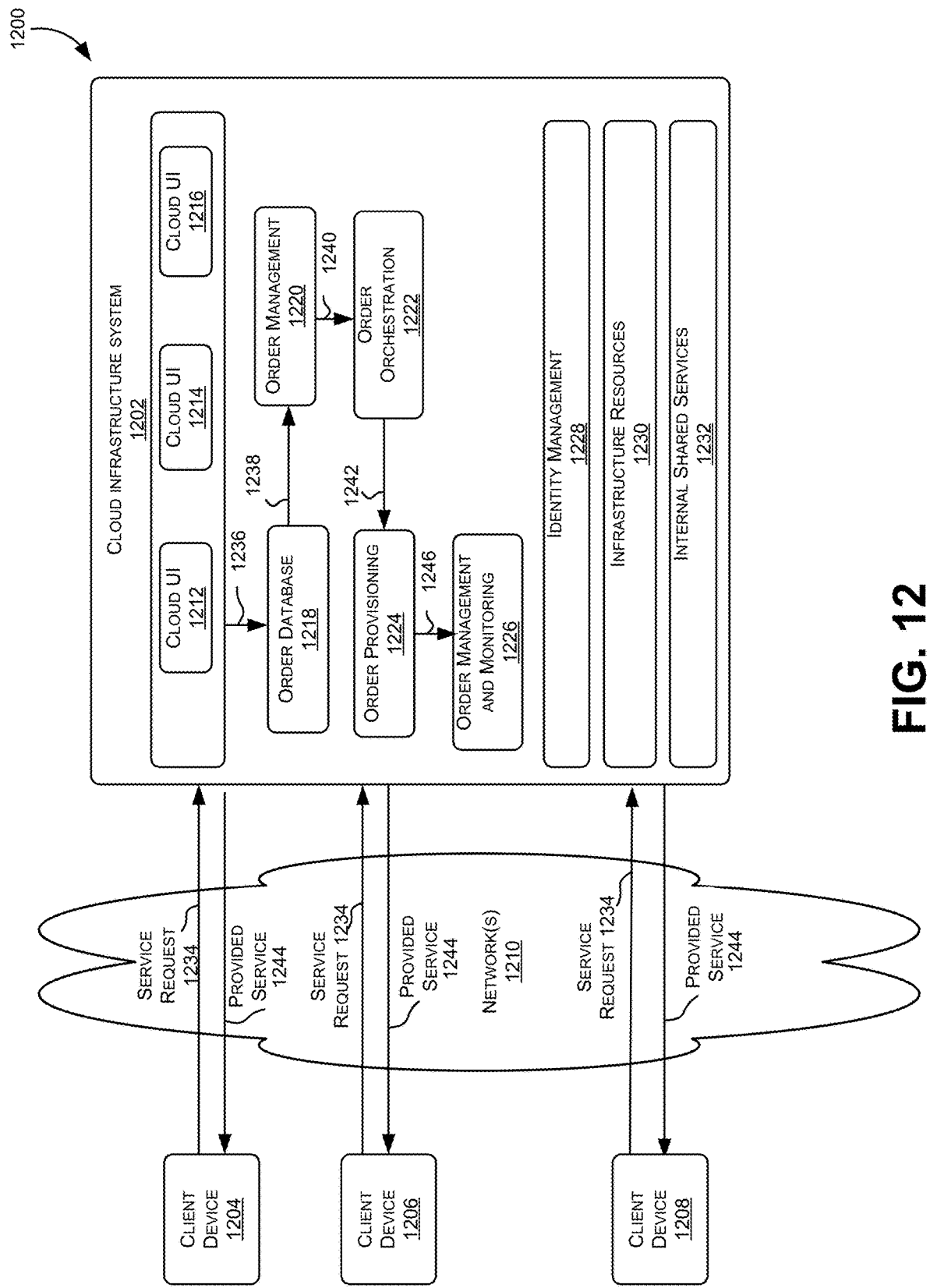
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the system shown in the figure is only one example of a cloud infrastructure system that may incorporate some embodiments. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

FIG. 13 illustrates an exemplary computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with some embodiments.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium storing instructions that, when executed by one or more processors, cause the one or more processors to perform operations comprising:
    receiving one or more log messages from a process, wherein the process experiences an error during execution;
    extracting information related to the error for the one or more log messages;
    generating a Uniform Resource Locator (URL) using the information related to the error, wherein the URL comprises a support URL that redirects to a support center with a search string that retrieves support resources to address the error for a search interface of the support center;
    embedding the URL in a log file with the one or more log messages; and
    accessing the log file to activate the URL and redirect to the support center to automatically populate the search interface of the support center with the search string that retrieves the support resources to address the error and perform a search.

2. The non-transitory computer-readable medium of claim 1, wherein the one or more log messages further comprise a filename of a source code file from which a portion of the process where the error occurred was compiled.

3. The non-transitory computer-readable medium of claim 2, wherein the one or more log messages further comprise a line number in the source code file from which the portion of the process where the error occurred was compiled.

4. The non-transitory computer-readable medium of claim 2, wherein the filename of the source code file is generated automatically when the source code file is compiled by replacing a macro in the source code file with the filename of the source code file by a compiler.

5. The non-transitory computer-readable medium of claim 2, wherein the filename of the source code file is determined by accessing a call stack.

6. The non-transitory computer-readable medium of claim 1, wherein the information related to the error is embedded in the one or more log messages.

7. The non-transitory computer-readable medium of claim 1, wherein the URL further comprises a developer URL that includes a source code repository host address.

8. The non-transitory computer-readable medium of claim 7, wherein the source code repository host address is retrieved from a configuration file that is separate from the one or more log messages.

9. The non-transitory computer-readable medium of claim 8, wherein the configuration file is accessed to provide information for a plurality of URLs from a plurality of different process errors.

10. The non-transitory computer-readable medium of claim 7, wherein the developer URL further comprises a source code version, a source code filename, and a line number corresponding to the error.

11. The non-transitory computer-readable medium of claim 1, wherein the support URL further includes an error code in the search string that retrieves the support resources to address the error.

12. The non-transitory computer-readable medium of claim 11, wherein activating the URL further comprises automatically displaying results of the search.

13. The non-transitory computer-readable medium of claim 1, wherein the URL is embedded in the log file as a hyperlink.

14. The non-transitory computer-readable medium of claim 1, further comprising:
    determining whether a type of a user account requesting the URL comprises a developer account or a support account; and
    providing a developer URL or the support URL depending on the type of the user account.

15. The non-transitory computer-readable medium of claim 1, wherein the URL further comprises an address of a login portal.

16. The non-transitory computer-readable medium of claim 15, wherein the login portal routes requests to the support center or to a source code repository based on a login credential.

17. The non-transitory computer-readable medium of claim 1, wherein the URL is generated by a support workstation.

18. The non-transitory computer-readable medium of claim 1, wherein the URL is generated by a developer workstation.

19. A method of generating URLs in log files for source code repositories and support centers, the method comprising:
    receiving one or more log messages from a process, wherein the process experiences an error during execution;
    extracting information related to the error for the one or more log messages;
    generating a Uniform Resource Locator (URL) using the information related to the error, wherein the URL comprises a support URL that redirects to a support center with a search string that retrieves support resources to address the error for a search interface of the support center;
    embedding the URL in a log file with the one or more log messages; and
    accessing the log file to activate the URL and redirect to the support center to automatically populate the search interface of the support center with the search string that retrieves the support resources to address the error and perform a search.

20. A system comprising:
    one or more processors; and one or more memory devices storing instructions that, when executed by the one or more processors, cause the one or more processors to perform operations comprising:
receiving one or more log messages from a process, wherein the process experiences an error during execution;
extracting information related to the error for the one or more log messages;
generating a Uniform Resource Locator (URL) using the information related to the error, wherein the URL comprises a support URL that redirects to a support center with a search string that retrieves support resources to address the error for a search interface of the support center;
embedding the URL in a log file with the one or more log messages; and
accessing the log file to activate the URL and redirect to the support center to automatically populate the search interface of the support center with the search string that retrieves the support resources to address the error and perform a search.

* * * * *